US008911224B2

(12) United States Patent
Correia

(10) Patent No.: US 8,911,224 B2
(45) Date of Patent: Dec. 16, 2014

(54) APPARATUS AND MOLD ASSEMBLY FOR MOLDING AND DEMOLDING CEMENTITIOUS PRODUCTS AND METHODS THEREFOR

(76) Inventor: Horacio Correia, Terrebonne (CA)

( * ) Notice: Subject to any disclaimer, the term of this patent is extended or adjusted under 35 U.S.C. 154(b) by 291 days.

(21) Appl. No.: 13/349,373

(22) Filed: Jan. 12, 2012

(65) Prior Publication Data

US 2012/0181719 A1 Jul. 19, 2012

Related U.S. Application Data

(60) Provisional application No. 61/432,067, filed on Jan. 12, 2011.

(51) Int. Cl.
*B29C 41/22* (2006.01)
*B28B 7/06* (2006.01)
*B28B 13/06* (2006.01)

(52) U.S. Cl.
CPC ................ *B28B 13/062* (2013.01); *B28B 7/06* (2013.01)
USPC ........................... 425/253; 425/440; 249/127

(58) Field of Classification Search
USPC ................................. 425/253, 440; 249/127
See application file for complete search history.

(56) References Cited

U.S. PATENT DOCUMENTS

| | | | | |
|---|---|---|---|---|
| 1,469,819 | A * | 10/1923 | Ruby | 425/439 |
| 3,844,524 | A * | 10/1974 | Fisher et al. | 249/120 |
| 3,982,874 | A * | 9/1976 | Nobbe | 425/424 |
| 5,783,135 | A * | 7/1998 | Smith et al. | 264/313 |
| 7,887,317 | B1 * | 2/2011 | Barrett, Jr. | 425/440 |
| 2007/0096369 | A1 * | 5/2007 | Webb et al. | 264/334 |
| 2007/0152376 | A1 * | 7/2007 | Verhoff et al. | 264/334 |

* cited by examiner

*Primary Examiner* — James Sanders
(74) *Attorney, Agent, or Firm* — Ladas & Parry LLP

(57) ABSTRACT

An assembly for molding and demolding hardened cementitious products comprises a flexible mold and a demolding apparatus. The flexible mold has a top side with separate openings for receiving cementitious material therein for hardening thereof, an opposite closed rear side and a perimeter. The apparatus for demolding the hardened cementitious products from the flexible mold comprises a conveyor, a holding member, a clamp, and a movable member. The conveyor conveys the flexible mold. The clamp grips a portion of the perimeter. The holding member engages the mold. The movable member moves the clamp and the clamped portion of the mold about the holding member thereby disengaging the flexible mold from the cementitious material.

15 Claims, 7 Drawing Sheets

APPARATUS AND MOLD ASSEMBLY FOR MOLDING AND DEMOLDING CEMENTITIOUS PRODUCTS AND METHODS THEREFOR

CROSS-REFERENCE TO RELATED APPLICATIONS

The present application claims priority on U.S. Provisional Patent Application Ser. No. 61/432,067 filed on Jan. 12, 2011 and being incorporated herein by reference in their entirety.

TECHNICAL FIELD

The present disclosure concerns cementitious products such as precast cement or concrete blocks, bricks, pavers, tiles and the like articles. More specifically, but not exclusively, the present disclosure relates to an apparatus for demolding cementitious products. More specifically, but still not exclusively, the present disclosure relates to methods for molding and demolding cementitious products. The present disclosure also concerns an assembly for molding and demolding cementitious products.

BACKGROUND

There exists a variety of known methods for molding blocks such as pre-cast, cement, cementitious or concrete blocks, bricks, pavers, tiles and like articles. A challenge in the art is to de-mold these articles after curing. This challenge is due to the fact that removing the blocks from their mold is often difficult, requires elaborate, complex and expensive machinery that succumbs easily to wear and tear thereby raising costs and causes damage to or destruction of the molded articles. For example, many de-molding machines use reciprocating hammers which repeatedly hit the mold repeatedly until the blocks, pavers, tiles or like articles pop out of their mold compartments and are then removed by hand.

Improvements in molds include flexible molds. Yet, flexible molds do not produce straight products similar to hard conventional molds, because their cavity walls are not rigid enough. Also, when removing flexible molds from the cementitious products, the demolding process often damages the products.

OBJECTS

An object of the disclosure is to provide an apparatus for molding and demolding cementitious products.

An object of the disclosure is to provide a method for molding and demolding cementitious products.

An object of the disclosure is to provide a mold for molding and demolding cementitious products.

An object of the disclosure is to provide an apparatus for molding and demolding cementitious products.

SUMMARY

In accordance with an aspect of the disclosure, there is provided an assembly for molding and demolding hardened cementitious products comprising: a flexible mold having a top side with separate openings for receiving cementitious material therein for hardening thereof, an opposite closed rear side and a perimeter; and an apparatus for demolding the hardened cementitious products from the flexible mold comprising: a conveyor for conveying the flexible mold with the front face down; a clamp for clamping a portion of the perimeter; a holding member for engaging the mold rear side; and a movable member for moving the clamp and the clamped portion of the mold upwardly causing the mold to curve about the holding member thereby disengaging the flexible mold from the cementitious material.

In accordance with an aspect of the present disclosure, there is provided an apparatus for demolding hardened cementitious products from a flexible mold having a top side with separate openings for receiving cementitious material therein for hardening thereof, an opposite closed rear side and a perimeter, the apparatus comprising: a conveyor for conveying the flexible mold with the front face down; a clamp for clamping a portion of the perimeter of the mold; a holding member for engaging the rear side of the mold; and a movable member for moving the clamp and the clamped portion of the mold upwardly causing the mold to curve about the holding member thereby disengaging the flexible mold from the cementitious material.

In an embodiment, the conveyor provides for conveying the mold in tandem with the movable member moving the clamp and the clamped portion upwardly thereby progressively disengaging the flexible mold from the cementitious material.

In an embodiment, the apparatus further comprises a pusher for engaging a portion of the cementitious material when disengaged from the mold so as to avoid for the cementitious material to be raised along with the clamped portion when upwardly moved. In an embodiment, the pusher comprises a movable bracket movable along the length of the conveyor. In an embodiment, the movable bracket is connected to a stationary bracket via a movement imparting device for being moved towards and away from the stationary bracket. In an embodiment, the movable bracket is slidable along a guide rail.

In an embodiment, the perimeter of the mold has a flange like configuration.

In an embodiment, the conveyor comprises an upstream surface and a downstream surface, the downstream surface being slightly lower than the upstream surface so as to provide a space between the perimeter of the mold and the downstream surface thereby allowing for the clamp to engage the perimeter.

In an embodiment, the holding member comprises rollers.

In accordance with an aspect of the present disclosure, there is provided an assembly for molding and demolding hardened cementitious products comprising: a flexible mold having a top side with separate openings for receiving cementitious material therein for hardening thereof, an opposite closed rear side and a perimeter, the apparatus for demolding hardened cementitious products from the flexible mold comprising: a conveyor for conveying the flexible mold on the rear side thereof; a clamp for clamping a portion of the perimeter; a holding member for engaging the top side; and a movable member for moving the clamp and the clamped portion of the mold downwardly causing the mold to curve thereby disengaging the flexible mold from the cementitious material.

In accordance with an aspect of the present disclosure, there is provided an apparatus for demolding hardened cementitious products from a flexible mold having a top side with separate openings for receiving cementitious material therein for hardening thereof, an opposite closed rear side and a perimeter, the apparatus comprising: a conveyor for conveying the flexible mold on its rear side; a clamp for clamping a portion of the perimeter of the mold; a holding member for engaging the top side of the mold; and a movable member for moving the clamp and the clamped portion of the mold downwardly causing the mold to curve thereby disengaging the flexible mold from the cementitious material.

In accordance with an aspect of the present disclosure, there is provided a method for molding a hardened cementitious product comprising: providing a flexible mold; applying a demolding agent on the surface of the flexible mold; applying coloring agents on the surface of the flexible mold; pouring cementitious material within the flexible mold; vibrating the mold with cementitious material; curing the cementitious material so as to provide hardened cementitious products; pulling a portion of the flexible mold away from the hardened material so as to disengage the flexible mold therefrom; holding the cementitious products so as to avoid them from moving with the flexible mold during the pulling step; and holding a portion of the flexible mold during the pulling step so as to avoid for the held portion from being pulled In accordance with an aspect of the disclosure there is provided a method for molding a hardened cementitious product comprising: providing a flexible mold; applying a demolding agent on the surface of the flexible mold; applying coloring agents on the surface of the flexible mold pouring cementitious material within the flexible mold; vibrating the mold with cementitious material; and curing the cementitious material so as to provide hardened cementitious products.

In accordance with an aspect of the disclosure there is provided a method for demolding hardened cementitious products from a flexible mold having a closed bottom face and an opposite top face with openings exposing the cementitious products, the method comprising: conveying the flexible mold with its top face interfacing with a surface; pulling a leading portion of the flexible mold away from the surface so as to pull off the mold from the cementitious blocks; holding the cementitious blocks onto the surface during the pulling step; and holding a portion of the bottom face of the mold adjacent the leading portion thereof towards the surface.

In accordance with an aspect of the disclosure there is provided a method for molding and demolding a hardened cementitious product comprising: providing a flexible mold having a closed bottom face and an opposite top face with openings for receiving cementitious material; applying a demolding agent on the surface of the flexible mold; applying coloring agents on the surface of the flexible mold; pouring cementitious material within the flexible mold; vibrating the mold with cementitious material; curing the cementitious material so as to provide hardened cementitious products; conveying the flexible mold with its top face interfacing with a surface; pulling a leading portion of the flexible mold away from the surface so as to pull off the mold from the cementitious blocks; holding the cementitious blocks onto the surface during the pulling step; and holding a portion of the bottom face of the mold adjacent the leading portion thereof towards the surface.

In an embodiment, there is provided a method for molding and demolding hardened cementitious products from a flexible mold having a closed bottom face and an opposite top face with openings exposing the cementitious products comprising a molding method and a demolding method. The molding method comprises applying demolding and coloring agents on the mold and pouring the cementitious material therein. The filled mold is vibrated and then time is allowed for curing. The flexible mold is then conveyed with its top face interfacing with a surface and a leading portion thereof is pulled away from the surface so as to pull off the mold from the cementitious blocks. The cementitious blocks and the rear side of the mold are held against the surface.

Other objects, advantages and features of the present disclosure will become more apparent upon reading of the following non-restrictive description of illustrative embodiments thereof, given by way of example only with reference to the accompanying drawings.

DETAILED DESCRIPTION OF THE ILLUSTRATIVE EMBODIMENTS

Generally stated, there is provided an assembly for molding and demolding hardened cementitious products comprising a flexible mold and a demolding apparatus. The flexible mold has a top side with separate openings for receiving cementitious material therein for hardening thereof, an opposite closed rear side and a perimeter. The apparatus for demolding the hardened cementitious products from the flexible mold comprises a conveyor, a holding member, a clamp, and a movable member. The conveyor conveys the flexible mold. The clamp grips a portion of the perimeter. The holding member engages the mold. The movable member moves the clamp and the clamped portion of the mold about the holding member thereby disengaging the flexible mold from the cementitious material.

Figure 1:
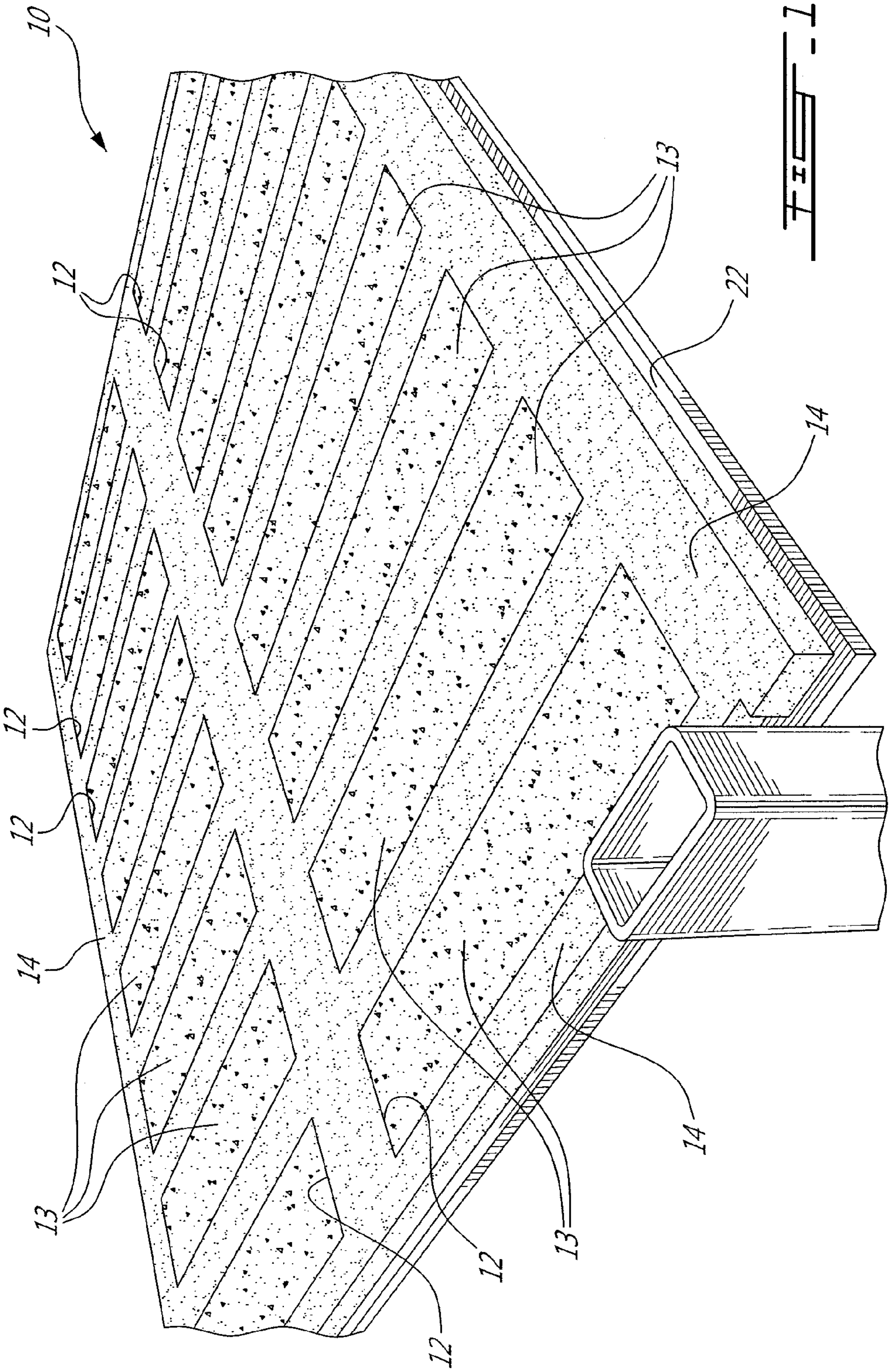
FIG. 1 is a perspective view of a flexible mold mounted to a support shell for molding cementitious material in accordance with a non-restrictive illustrative embodiment of the present disclosure.

FIG. 1 shows a mold 10 comprising a plurality of mold openings 12 for receiving cementitious material 13 therein. More specifically, the mold 10 includes a flat flange-like top perimeter 14 from which depend a plurality of bottom longitudinal containers 16 (see FIG. 5), each container providing for receiving the cementitious material 13 therein. The mold 10 is flexible and as such can be made from a variety of flexible materials such as polyurethane, silicone and like materials.

In one embodiment, the mold 10 is formed within a molding frame that is correspondingly configured to provide the configuration of the mold 10. In one embodiment, blocks are used to provide the shape, size and layout of the opening. In one embodiment, a floor layer of the mold is solidified first and the blocks are placed thereon with more material being poured into the frame to form a second layer around these blocks. Of course, a variety of ways of forming the mold 10 can be contemplated within the scope of the present disclosure.

Figure 2:
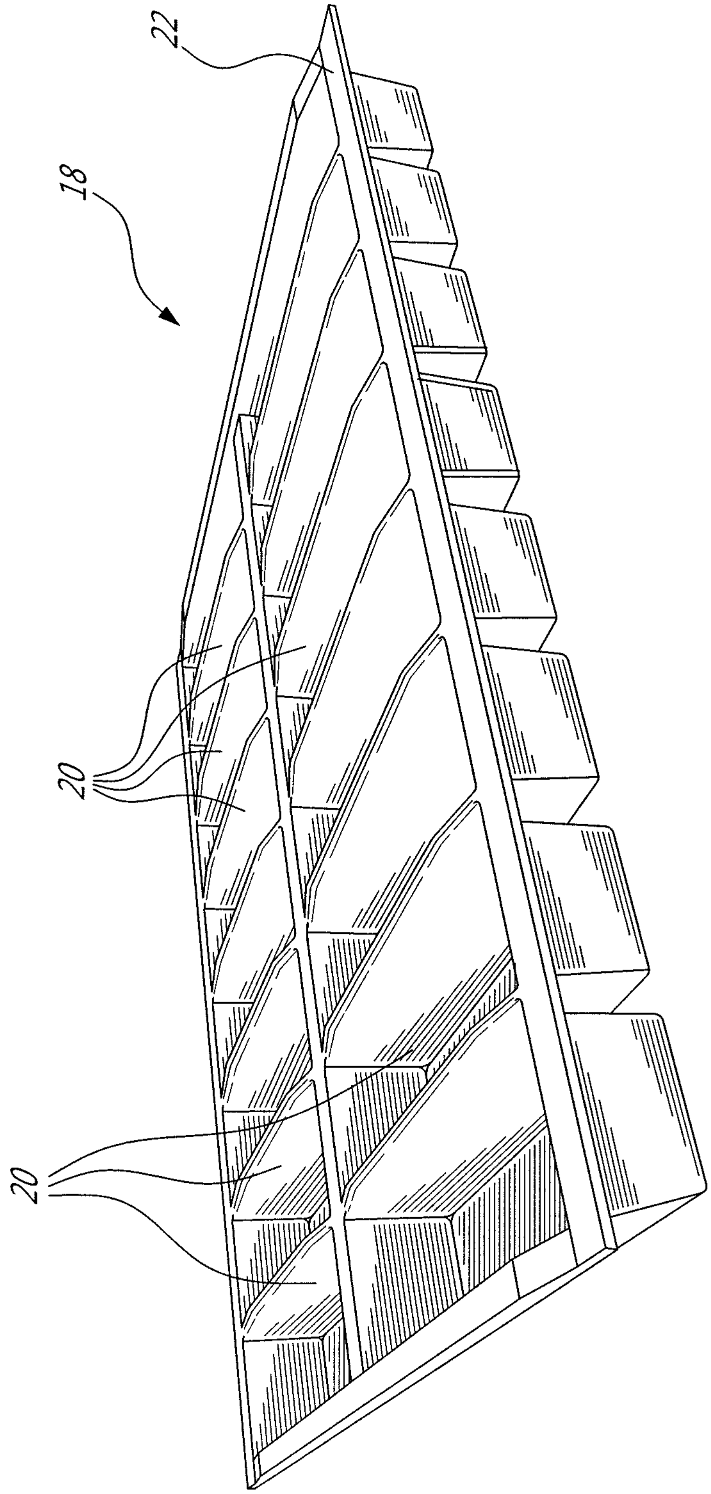
FIG. 2 is a perspective view of a support shell for supporting a flexible mold in accordance with a non-restrictive illustrative embodiment of the present disclosure.

FIG. 2 shows a shell 18 used to support flexible mold 10. The shell 18 can be made by a strong material such as wood, plastic, fiberglass or steel. The shell 18 provides for maintaining the geometry of the cementitious products 13 during the pouring stage since the material forming the walls of the of the bottom containers 16 is conveniently thin thereby providing for demolding as will be explained herein. As such, the shell 18 acts as a support to avoid the mold 10 and especially the formed containers 16 thereof from being deformed during the pouring of cementitious material 13 within the opening 12. The shell 18 includes open cavities 20, each bottom container 16 is fitted within a respective open cavity 20 and the mold top portion 14 rests on the rim 22 of the shell 18 defined between the open cavities 20 as shown in FIG. 1.

Figure 3:
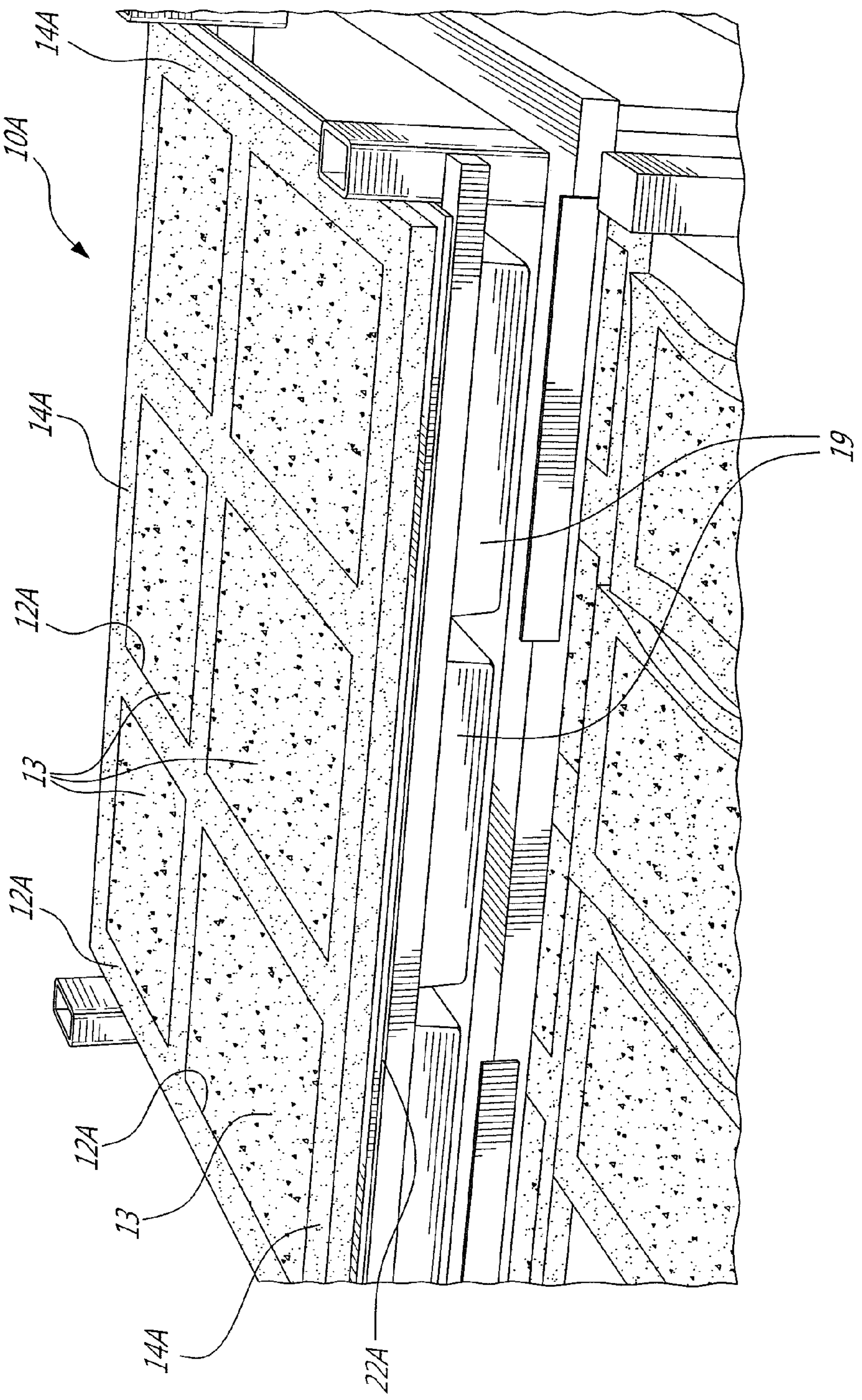
FIG. 3 is a perspective view of a flexible mold mounted to a support shell for molding cementitious material in accordance with another non-restrictive illustrative embodiment of the present disclosure.

FIG. 3 shows a mold 10A having a different configuration than mold 10. The mold 10A includes opening 12A for cementitious material 13. Mold 10A is positioned within a supporting shell 18A which includes bottom embossments 19 that form cavities (not shown) for receiving the bottom containers (not shown) of the mold 10A. The perimeter 14A of the mold 10A defines a flange structure which rests on the rim 22A.

Figure 4:
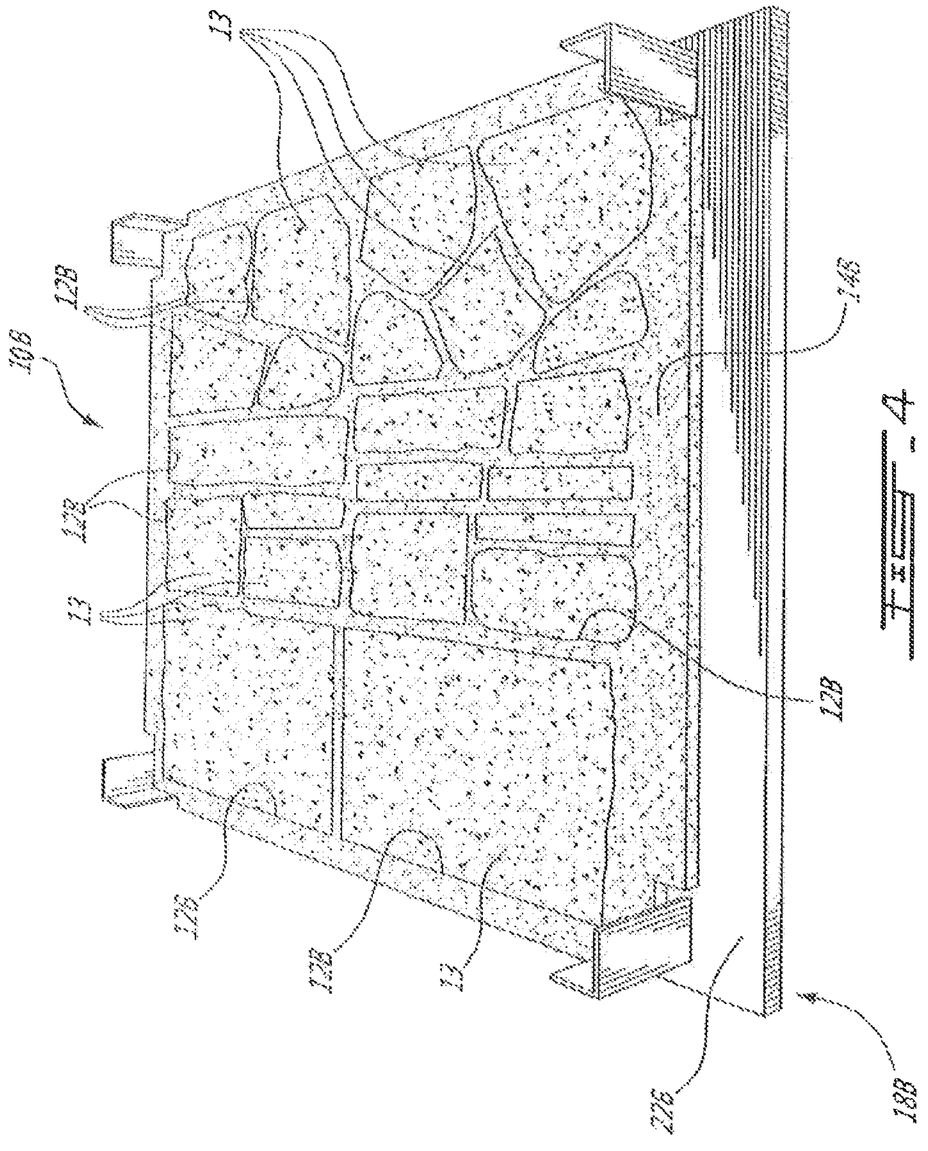
FIG. 4 is a perspective view of a flexible mold mounted to a support shell for molding cementitious material in accordance with a further non-restrictive illustrative embodiment of the present disclosure.

FIG. 4 shows a mold 10B providing openings 12B with a variety of configurations in order to produce cementitious products 13 having corresponding configurations. Again, the mold 10B is supported by a shell 18B. In this instance, since the mold 10B seeks to produce variably shaped blocks, the bottom portion (not shown) of the mold 10B is not be divided into separate containers but will form one large bottom extending container without separation or delineations between the adjacent cavities defined by the openings 12B. Correspondingly, the shell 18B includes a single cavity to receive and support the container of the mold 10B. The perimeter 14B of the mold 10B is flange shaped and rests on the rim 22B of the shell 18B.

The particular products 13 are longitudinal brick-like blocks, yet in other cases, thin paver-like structures will be used. In this case, a thin polyurethane or flexible mold structure is provided comprising a plurality of openings which are differently configured in order to provide differently shaped products. In this case, the use of a shell 18 is not necessary and the flexible mold can simply be placed on a flat support.

As such, a variety of structures and configurations can be used for the molds of the present disclosure.

Turning back to mold 10, after pouring cementitious material within the openings 12, appropriate time for curing is allowed in order to provide hardened or finished cementitious products 13. Once this time has lapsed, a demolding process is executed.

The first step is to turn the shell 18 and mold 10 face down. The shell 18 is then removed leaving only the flexible mold 10 with the cementitious products 13 therein.

Figure 5:
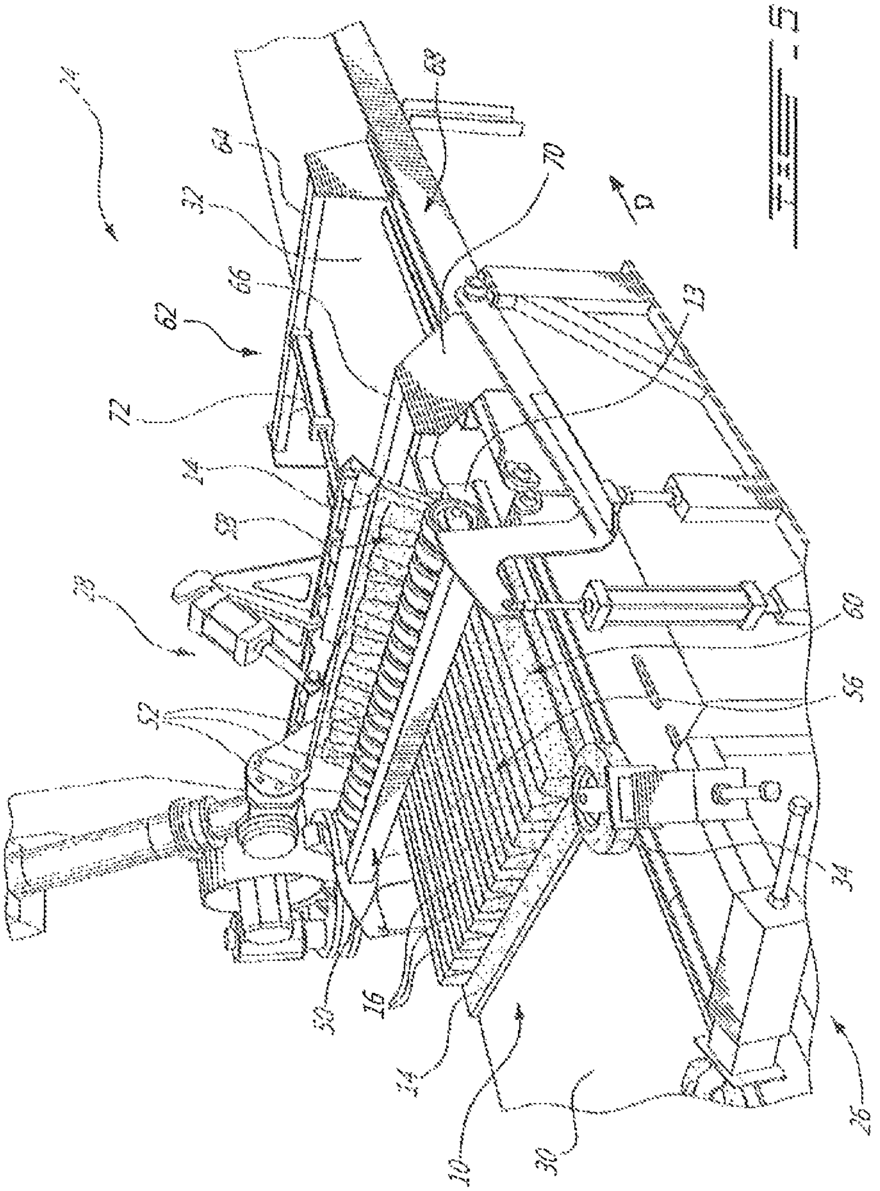
FIG. 5 is rear perspective view of an assembly for molding and demolding cementitious products including a flexible mold and a demolding apparatus in accordance with a non-restrictive illustrative embodiment of the present disclosure.
Figure 6:
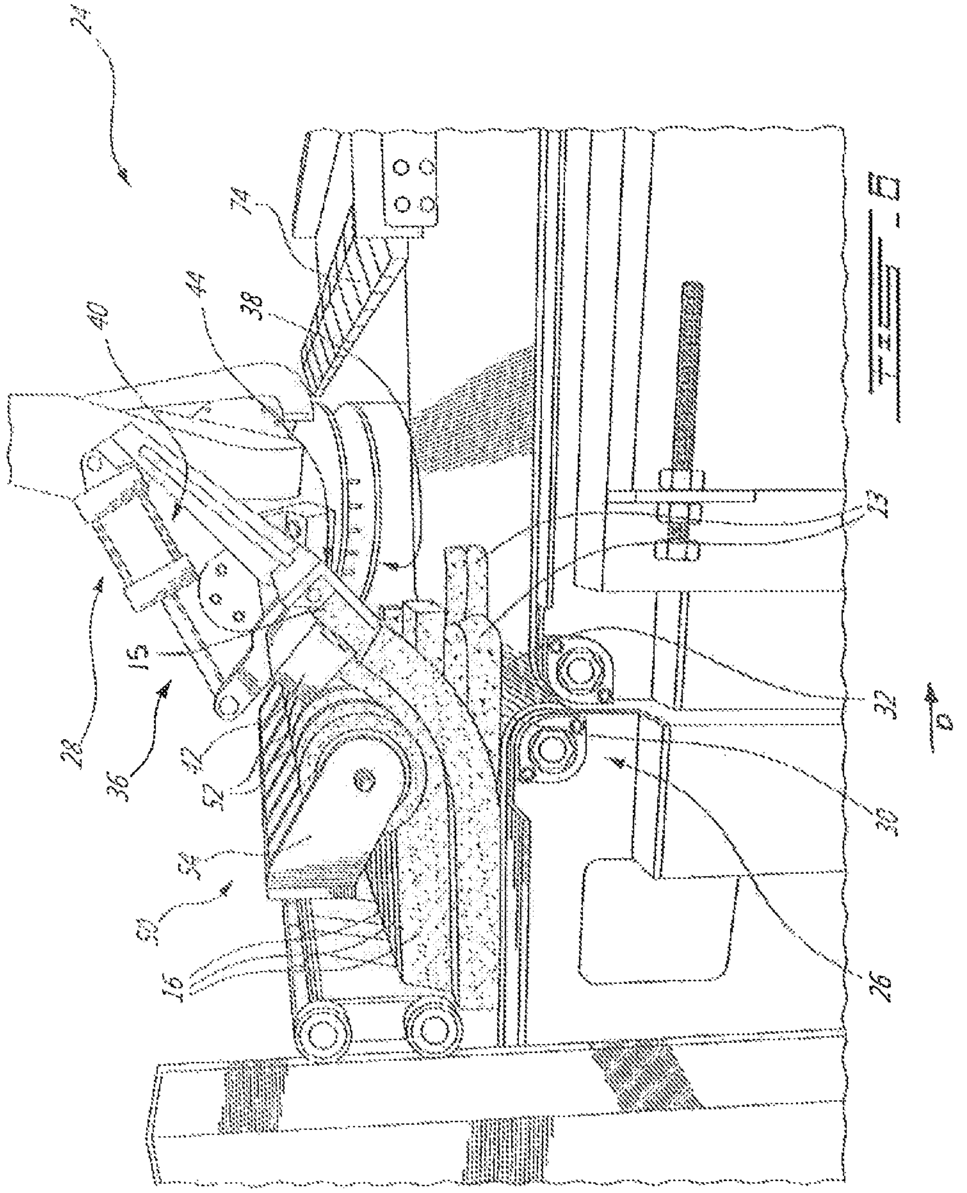
FIG. 6 is a lateral view of the assembly of FIG. 5.

Turning to FIGS. 5 and 6 there is shown an apparatus 24 comprising a conveyor assembly 26 on with the mold 10 positioned thereon face down for moving the mold 10 in the direction shown by arrow D. The apparatus 24 includes a demolding station 28. The conveyor assembly 26 includes an upstream conveyor device 30 and a downstream conveyor device 32. The demolding station 28 is positioned at the juncture of the conveyor devices 30 and 32. Conveyor devices 30 and 32 are slightly offset, with the downstream conveyor 32 being slightly lower than the upstream conveyor 30. Thus, the conveyor provides an upstream surface and a downstream surface, with the downstream surface being lower than the upstream surface. Side rollers 34 maintain the mold 10 in position on the conveyor device 30 as it is being conveyed to the demolding station 28.

The demolding station 28 comprises a clamping device 36. The clamping device 36 comprises a clamp 38 mounted to a movable member or arm 40 (such as a robotic arm or any other like device). As the mold 10 is moved from the upstream conveyor device 30 to the downstream conveyor device 32, a space is provided between the leading portion 15 of the flange shaped perimeter 14. The clamp 38 comprises top and bottom clamping elements 42 and 44 respectively. The bottom clamping element 44 is thin enough to fit within the space between the leading portion 15 and the conveyor device 32. Concurrently, the top clamping element engages the leading portion 15 at the top side thereof and the leading portion 15 is gripped by the clamp 38.

The movable arm 40 moves the clamp 38 and the gripped portion 15 upwardly away from the conveyor assembly 26.

A rear holding member 50 in the form of rollers 52 mounted to a shaft (now shown) supported by side brackets 54 engages the rear side 56 of the mold 10 so at to add pressure onto the mold holding it in place against the conveyor assembly 26. The holding member 50 is positioned sufficiently behind the leading flange portion 15 of the mold 10, providing for the portion 58 of the mold 10 that is in front of the rollers 52 to curve upwardly about the rollers 52 as it is lifted by the clamp 38 and providing for the portion 60 of the mold 10 behind the rollers to not be moved upwardly thus allowing for the mold 10 to be pulled away and disengaged from the hardened cementitous material 13.

The demoulding station 28 includes a pusher assembly 62. The pusher assembly comprises a stationary bracket 64 and a movable bracket 66 that slides along guide rails 68 on each lateral side of the conveyor device 32. The movable bracket has side flaps 70, each of which slidably engage a respective guide rail 68. A movement imparting device 72 is mounted to both the stationary bracket 64 and the movable bracket 66 to move towards and away the juncture between the conveyor devices 30 and 32. The movement imparting device 72 in this example is a hydraulic cylinder.

The movable bracket 66 includes a material engaging front edge portion 74. The pusher portion 74 is moved so as to be positioned between the flexible mold portion 15 and the hardened cementitious material 13 as they are disengaged from each other, thereby holding hardened cementitious products 13 so that they are not expelled out of the conveyor 32.

As the hardened cementitious material 13 is removed from the mold 10, the bracket 66 is withdrawn and moved back towards the stationary bracket 64.

The mold 10 is progressively moved in the downstream direction D, progressively disengaging an ever greater amount of cementitious material 13 as the mold 10 is moved further upwardly by the clamp 38 and arm 40 until full disengagement.

The hardened cementitious material 13 is then conveyed in the direction D along the conveyor device 32 for packaging. The mold openings 12 of the mold are so positioned so as to provide for laying out the cementitious products 13 when disengaged therefrom in a ready to package configuration.

Figure 7A:
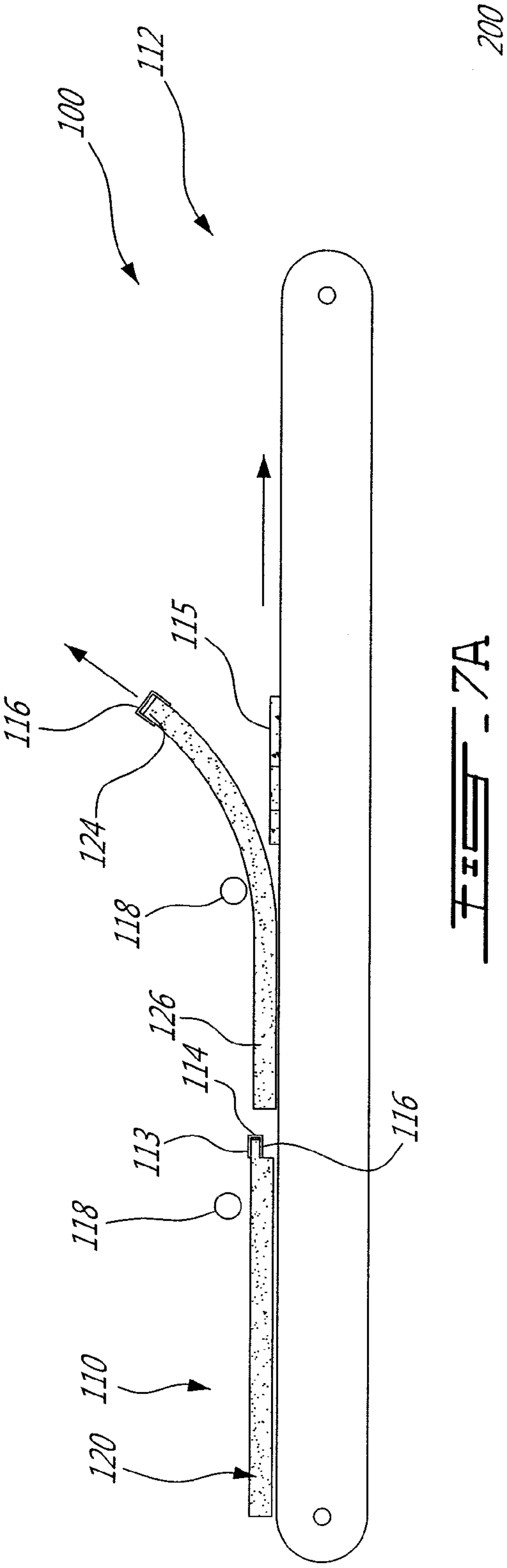
FIGS. 7A and 7B are schematic views of various demolding operations in accordance with non-restrictive illustrative embodiments of the present disclosure.

FIG. 7A is a schematic representation of the system of the present disclosure, showing an apparatus 100 with a mold 110 on a conveyor 112 having a flange portion 114 extending from a top edge 113 of the mold 110 that is clamped to be pulled upwardly to release hardened material 115 via a clamping device 116 in relation to a rear holding element 118 which engages the rear side 120 of the mold. FIG. 7A also shows a mold 122 that does not have a flange portion but a front portion 124 that has the same thickness as the rest of the body 126 of the mold 122.

Figure 7B:
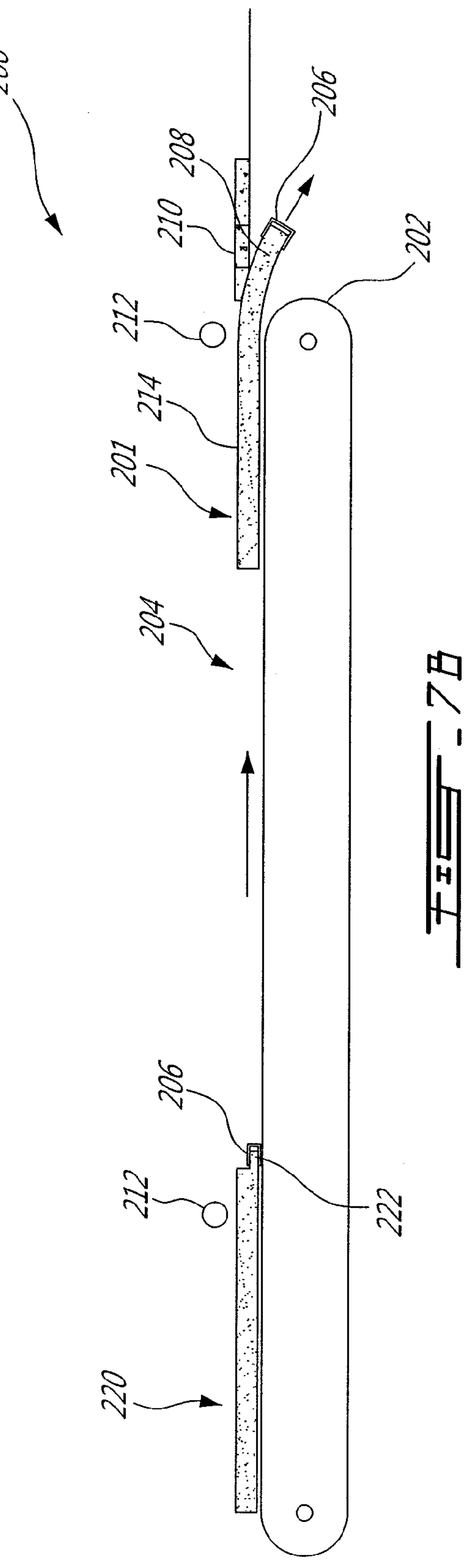

FIG. 7B shows an apparatus 200 for a mold 201. The mold 201 is pulled downwardly at the edge 202 of the conveyor belt 204 via a clamp 206 that clamps the front portion 208 of the mold 201 to release the hardened material 210. A holding element 212 holds the top side 214 of the mold 210. The mold 220 includes a front flange 222 that is clamped via a clamping member 206.

The demolding apparatuses and molds provided herein together provide assemblies for molding and demolding cementitious products.

In an embodiment, the pouring process comprises the following steps:

A demolding agent is applied to mold surface and sufficient time is provided so that agent dries. Coloring agents are applied onto the mold via brushes or nozzles. The cementitious material is then poured into each mold via pump for example, while avoiding vibrations. Once the mold is filled with cementitious material it is then vibrated to remove air bubbles along the surface thereof. The process is concluded with curing before demolding.

It is to be understood that the disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation.

Hence, although the present disclosure has been described hereinabove by way of embodiments thereof, it can be modified, without departing from the spirit, scope and nature of the subject disclosure as defined herein.

What is claimed is:

1. An assembly for molding and demolding hardened cementitious products comprising:

a flexible mold having a top side with separate openings for receiving cementitious material therein for hardening thereof, an opposite closed rear side and a perimeter; and an apparatus for demolding the hardened cementitious products from said flexible mold comprising:

a conveyor for conveying said flexible mold with a front face down;

a clamp for clamping a portion of said perimeter;

a holding member for engaging said mold rear side;

a movable member for moving said clamp and said clamped portion of said mold upwardly causing said mold to curve about said holding member thereby disengaging said flexible mold from the cementitious material; and wherein said conveyor comprises an upstream surface and a downstream surface, said downstream surface being slightly lower than said upstream surface so as to provide a space between said perimeter of said mold and said downstream surface thereby allowing for said clamp to engage said perimeter.

2. An assembly according to claim 1, wherein said conveyor provides for conveying said mold in tandem with said movable member moving said clamp and said clamped portion upwardly thereby progressively disengaging said flexible mold from the cementitious material.

3. An assembly according to claim 1, further comprising a pusher for engaging a portion of the cementitious material when disengaged from said mold so as to avoid for the cementitious material to be raised along with said clamped portion when upwardly moved.

4. An assembly according to claim 3, wherein said pusher comprises a movable bracket movable along the length of said conveyor.

5. An assembly according to claim 4, wherein said movable bracket is connected to a stationary bracket via a movement imparting device for being moved towards and away from said stationary bracket.

6. An assembly according to claim 4, wherein said movable bracket is slidable along a guide rail.

7. An assembly according to claim 1, wherein said perimeter of said mold has a flange configuration.

8. An assembly according to claim 1, wherein said holding member comprises rollers.

9. An apparatus for demolding hardened cementitious products from a flexible mold having a top side with separate openings for receiving cementitious material therein for hardening thereof, an opposite closed rear side and a perimeter, said apparatus comprising:

a conveyor for conveying the flexible mold with a front face down;

a clamp for clamping a portion of the perimeter of the mold;

a holding member for engaging the rear side of the mold; and a movable member for moving said clamp and the clamped portion of the mold upwardly causing the mold to curve about said holding member thereby disengaging the flexible mold from the cementitious material; and wherein said conveyor comprises an upstream surface and a downstream surface, said downstream surface being slightly lower than said upstream surface so as to provide a space between the perimeter of the mold and said downstream surface thereby allowing for said clamp to engage the perimeter.

10. An apparatus according to claim 9, wherein said conveyor provides for conveying the mold in tandem with said movable member moving said clamp and the clamped portion of the mold upwardly thereby progressively disengaging the flexible mold from the cementitious material.

11. An apparatus according to claim 9, further comprising a pusher for engaging a portion of the cementitious material when disengaged from said mold so as to avoid for the cementitious material to be raised along with said clamped portion when upwardly moved.

12. An apparatus according to claim 11, wherein said pusher comprises a movable bracket movable along the length of said conveyor.

13. An apparatus according to claim 12, wherein said movable bracket is connected to a stationary bracket via a movement imparting device for being moved towards and away said stationary bracket.

14. An apparatus according to claim 12, wherein said movable bracket is slidable along a guide rail.

15. An apparatus according to claim 9, wherein said holding member comprises rollers.

* * * * *